(12) United States Patent
Metlapalli (10) Patent No.: US 7,716,100 B2
(45) Date of Patent: May 11, 2010

(54) METHODS AND SYSTEMS FOR COMPUTING PLATFORM

(75) Inventor: Kumar C. Metlapalli, North Andover, MA (US)

(73) Assignee: Kuberre Systems, Inc., North Andover, MA (US)

( * ) Notice: Subject to any disclaimer, the term of this patent is extended or adjusted under 35 U.S.C. 154(b) by 366 days.

(21) Appl. No.: 11/599,911

(22) Filed: Nov. 15, 2006

(65) Prior Publication Data

US 2007/0192241 A1 Aug. 16, 2007

Related U.S. Application Data

(60) Provisional application No. 60/741,680, filed on Dec. 2, 2005.

(51) Int. Cl.
*G06Q 40/10* (2006.01)

(52) U.S. Cl. ..................................................... 705/35

(58) Field of Classification Search .................. 705/35, 705/38
See application file for complete search history.

(56) References Cited

U.S. PATENT DOCUMENTS

| | | |
|---|---|---|
| 4,727,503 A | 2/1988 | McWhirter |
| 4,763,294 A | 8/1988 | Fong |
| 4,872,133 A | 10/1989 | Leeland |
| 4,962,381 A | 10/1990 | Helbig, Sr. |
| 5,020,059 A | 5/1991 | Gorin et al. |
| 5,072,371 A | 12/1991 | Benner et al. |
| 5,175,856 A | 12/1992 | Van Dyke et al. |
| 5,230,057 A | 7/1993 | Shido et al. |
| 5,274,832 A | 12/1993 | Khan |
| 5,471,627 A | 11/1995 | Means et al. |
| 5,477,221 A | 12/1995 | Chang et al. |
| 5,509,134 A | 4/1996 | Fandrich et al. |
| 5,570,040 A | 10/1996 | Lytle et al. |
| 5,640,586 A | 6/1997 | Pechanek et al. |
| 5,655,122 A | 8/1997 | Wu |
| 5,671,377 A | 9/1997 | Bleidt et al. |
| 5,675,803 A | 10/1997 | Preisler et al. |
| 5,715,453 A | 2/1998 | Stewart |
| 5,737,766 A | 4/1998 | Tan |
| 5,784,108 A | 7/1998 | Skaletzky et al. |
| 5,802,290 A | 9/1998 | Casselman |

(Continued)

OTHER PUBLICATIONS

Hoffmann, Rolf, "Implementation of Massively Parrallel Model GCA", 2004, Proceedings of the International Conference on Parallel Computing in Electrical Engineering (PARELEC 04), IEEE pp. 135-139.*

(Continued)

*Primary Examiner*—James P Trammell
*Assistant Examiner*—Abdul Basit
(74) *Attorney, Agent, or Firm*—Hamilton, Brook, Smith & Reynolds, P.C.

(57) ABSTRACT

Hardware accelerated analytical computing apparatus, method and system includes one or more analytical processing units. Each processing unit is formed of a respective field programmable gate array (FPGA) and performs a respective analytical operation. An application interface enables use of respective desired ones of the analytical processing units by one or more computer application programs. Different computer application programs utilize different ones of the analytical processing units. Each computer application program performs a respective analytical computation. Alternatively, an application program may be programmed into one of the FPGA's.

23 Claims, 2 Drawing Sheets

U.S. PATENT DOCUMENTS

| | | |
|---|---|---|
| 5,867,706 A | 2/1999 | Martin et al. |
| 5,892,962 A | 4/1999 | Cloutier |
| 5,903,771 A | 5/1999 | Sgro et al. |
| 5,915,123 A | 6/1999 | Mirsky et al. |
| 5,926,636 A | 7/1999 | Lam et al. |
| 5,953,502 A | 9/1999 | Helbig et al. |
| 5,956,518 A | 9/1999 | DeHon et al. |
| 5,966,534 A | 10/1999 | Cooke et al. |
| 5,987,480 A | 11/1999 | Donohue et al. |
| 6,009,410 A | 12/1999 | LeMole et al. |
| 6,023,755 A | 2/2000 | Casselman |
| 6,052,773 A | 4/2000 | DeHon et al. |
| 6,061,706 A | 5/2000 | Gai et al. |
| 6,076,152 A | 6/2000 | Huppenthal et al. |
| 6,077,315 A | 6/2000 | Greenbaum et al. |
| 6,079,032 A | 6/2000 | Peri |
| 6,128,663 A | 10/2000 | Thomas |
| 6,192,439 B1 | 2/2001 | Grunewald et al. |
| 6,215,898 B1 | 4/2001 | Woodfill et al. |
| 6,226,776 B1 | 5/2001 | Panchul et al. |
| 6,243,791 B1 | 6/2001 | Vondran |
| 6,247,110 B1 | 6/2001 | Huppenthal et al. |
| 6,286,135 B1 | 9/2001 | Santhanama |
| 6,289,440 B1 | 9/2001 | Casselman |
| 6,362,650 B1 | 3/2002 | New et al. |
| 6,385,757 B1 | 5/2002 | Gupta et al. |
| 6,434,687 B1 | 8/2002 | Huppenthal |
| 6,456,982 B1 | 9/2002 | Pilipovic |
| 6,460,122 B1 | 10/2002 | Otterness et al. |
| 6,507,898 B1 | 1/2003 | Gibson et al. |
| 6,526,572 B1 | 2/2003 | Brauch et al. |
| 6,539,438 B1 | 3/2003 | Ledzius et al. |
| 6,594,736 B1 | 7/2003 | Parks |
| 6,594,822 B1 | 7/2003 | Schweitz et al. |
| 6,631,518 B1 | 10/2003 | Bortnikov et al. |
| 6,684,193 B1 | 1/2004 | Chavez et al. |
| 6,704,816 B1 | 3/2004 | Burke |
| 6,714,041 B1 | 3/2004 | Darling et al. |
| 6,714,955 B2 | 3/2004 | Le Quere |
| 6,721,884 B1 | 4/2004 | De Oliveira Kastrup Pereira et al. |
| 6,751,792 B1 | 6/2004 | Nair |
| 6,839,893 B2 | 1/2005 | Bates et al. |
| 6,983,456 B2 | 1/2006 | Poznanovic et al. |
| 6,985,918 B2 | 1/2006 | Shackleford et al. |
| 7,093,023 B2 | 8/2006 | Lockwood et al. |
| 7,139,743 B2 | 11/2006 | Indeck et al. |
| 7,149,867 B2 | 12/2006 | Poznanovic et al. |
| 7,225,324 B2 | 5/2007 | Huppenthal et al. |
| 7,237,091 B2 | 6/2007 | Huppenthal et al. |
| 7,444,454 B2 * | 10/2008 | Yancey et al. ............... 710/312 |
| 2003/0046492 A1 | 3/2003 | Gschwind et al. |
| 2003/0046530 A1 | 3/2003 | Poznanovic |
| 2003/0084244 A1 | 5/2003 | Paulraj |
| 2003/0088737 A1 | 5/2003 | Burton |
| 2003/0208658 A1 | 11/2003 | Magoshi |
| 2004/0181378 A1 | 9/2004 | Gilmore |
| 2004/0186804 A1 | 9/2004 | Chakraborty et al. |
| 2004/0225483 A1 | 11/2004 | Okoniewski et al. |
| 2005/0015418 A1 | 1/2005 | Chang et al. |
| 2005/0033672 A1 | 2/2005 | Lasry et al. |
| 2005/0044327 A1 | 2/2005 | Howard et al. |
| 2005/0177485 A1 | 8/2005 | Peter |
| 2005/0209959 A1* | 9/2005 | Tenney ............... 705/39 |
| 2005/0251375 A1 | 11/2005 | Salwinski et al. |
| 2005/0278680 A1 | 12/2005 | Mukherjee et al. |
| 2005/0288800 A1 | 12/2005 | Smith et al. |
| 2006/0053295 A1 | 3/2006 | Madhusudan et al. |
| 2006/0294059 A1 | 12/2006 | Chamberlain et al. |

OTHER PUBLICATIONS

Heath, James, A Defect Tolerant Computer Architecture: Opportunities for Nanotechnology, Jun. 12, 1998, Science, pp. 1716-1721.*

Xu, X., et al., "Iterative Methods for Solving Linear Systems of Equations on FPGA-Based Machines," *Computers and Their Applications*, Proceedings of the ISCA 18$^{th}$ International Conference, pp. 472-475 (Mar. 2003).

Cowen, C.P., et al., "Performance Characteristics of the Monte-Carlo Clustering Processor (MCCP)—a Field Programmable Logic Based Custom Computing Machine," *Field-Programmable Logic*, pp. 312-314 (Sep. 1994).

Zhuo, L., et al., "Scalable and Modular Algorithms for Floating-Point Matrix Multiplication on FPGAs," *IEEE, Proceedings of the 18$^{th}$ International Parallel and Distributed Processing Symposium* (2004).

Govindu, G., et al., "Analysis of High-Performance Floating-Point Arithmetic on FPGAs," *IEEE, Proceedings of the 18$^{th}$ International Parallel and Distributed Processing Symposium* (2004).

Wang, X., et al., "Parallel Direct Solution of Linear Equations on FPGA-Based Machines," *IEEE Proceedings of the International Parallel and Distributed Processing Symposium* (2003).

Cadenas, O., et al., "FPGA Circuits for a Monte-Carlo Based Matrix Inversion Architecture," *ERSA '03 International Conference*, pp. 201-207.

Carro, L., et al., "FPGA Based Systems with Linear and Non-linear Signal Processing Capabilities," *IEEE, Proceedings of the 26$^{th}$ EUROMICRO Conference* (2000).

Shackleford, B., et al., "FPGA Implementation of Neighborhood-of-Four Cellular Automata Random Number Generators," *International Symposium on Field Programmable Gate Arrays*, pp. 106-112 (2002).

Plaks, T., et al., "Experiences Using Reconfigurable FPGAs in Implementing Monte-Carlo Methods," *PDPTA '99 International Conference*, pp. 1131-1137.

Koeune, F., et al., "An FPGA Implementation of the Linear Cryptanalysis," pp. 845-852, (2002).

Crookes, D., et al., "An Environment for Generating FPGA Architectures for Image Algebra-Based Algorithms," *Image Processing*, 3, pp. 990-994 (1998).

Jamali, M., et al., "ASIC Design of a Generalized Covariance Matrix Processor for DOA Algorithms," *Circuits and Systems*, 4, pp. 75-78 (1994).

Gao, H., et al., "A Novel Monte-Carlo Method for FPGA Architecture Research," *Solid-State and Integrated Circuits Technology*, 3, pp. 1944-1947 (2004).

Fischer, V., et al., "True Random Number Generator Embedded in Reconfigurable Hardware," *Lecture Notes in Computer Science 2523*, pp. 450-453 (2002).

Kohlbrenner, P., et al., "An Embedded True Random No. Generator for FPGAs," *International Symposium on Field Programmable Gate Arrays*, pp. 71-78 (2004).

Zhang, G.L., et al., "Reconfigurable Acceleration for Monte Carlo Based Financial Simulation," *Field-Programmable Technology*, pp. 215.222 (2005).

Yang, et al., "FPGA-Based Vector Processor for Algebraic Equation Solvers," *IEEE International Systems on-Chip Conference*, (Sep. 2005).

Chamberlain, R., et al., "The Mercury System: Exploiting Truly Fast Hardware for Data Search," *2003 International Workshop on Storage Network Architecture and Parallel*, pp. 65-72 (2003).

Fischer, V., et al., "High Performance True Random Number Generator in Altera Stratix FPLDs," *Field Programmable Logic and Application 3203*, pp. 555-564 (2004).

Tkacik, T.E., "A Hardware Random Number Generator," *Cryptographic Hardware and Embedded Systems 2523*, pp. 450-453 (2003).

Plaks, T.P., et al., "A Linear Algebra Processor Using Monte Carlo Methods," *2003 Military and Aerospace Programmable Logic Devices (MAPLD) International Conference*, pp. 1-3 (2003).

Anlauf, J., "Pricing of Derivatives by Fast, Hardware-Based Monte-Carlo Simulation," (Jan. 2005).

FPGA '98 ACM/SIGDA International Symposium on Field Programmable Gate Arrays (1998).

Davis, D., et al. "A Java Development and Runtime Environment for Reconfigurable Computing," *IEEE Symposium on Parallel and Distributed Processing*, pp. 43-48 (Mar. 1998).

Kim, M., et al. "Implementation of FPGA Based Fast Unitary Music DOA Estimator," *IEICE Transactions on Electronics, Electronics Society*, E87-C:9, pp. 1485-1494 (Sep. 2004.).

A-Team Group, "HPC Platform Selects Altera Stratix II FPGA Family for New HMPE System," [online]. Retrieved from the Internet Oct. 1, 2008. URL:www.a-teamgroup.com.

"Information Brief", PCI Bus Technology, © IBM Personal Computer Company, Rev. Apr. 9, 2003, pp. 1-4 (http://www.pc.ibm/us/infobrf/ibpci.html).

"Summary: The Cache Read/Write Process," The PC Guide, 2001, www.pcguide.com/ref/mbsys/cache/func.html.

Agarwal, A., et al., "The Raw Compiler Project,", MIT Laboratory for Computer Science, http//cag-www.Ics.mit.edu/raw, Proceedings of the Second SUIF Compiler Workshop, pp. 1-12 (Aug. 21-23, 1997).

Albaharna, O., et al., "On the Viability of FPGA-based integrated coprocessors", © IEEE, Publ. No. 0-8186-7548-9/96, pp. 206-215 (Apr. 17-19, 1996).

Alexander, T., et al., "A Reconfigurable Approach to a Systolic Sorting Architecture", *IEEE International Symposium on Circuits and Systems*, 2: pp. 1178-1182, XP010084477 (May 8-11, 1989).

Allan, V.H., et al., "Petri Net versus Modulo Scheduling for Software Pupelining", Department of Computer Science, Utah State University, IEEE, Proceedings of MICRO-28, 1995, pp. 105-110.

Amerson, R., et al., "Teramac-Configurable Custom Computing", © Proceedings of the IEEE Symposium on FPGA's for Custom Computing Machines (FCCM '95) Publ. No. 0-8186-7086-X/95, pp. 32-38.

Arnold, J. M., et al., "The Splash 2 Processor and Applications", Computer Design: VLSI in Computers and Processors, 1993, ICCD '93 Proceedings, 1993 IEEE International Conference on Cambridge, MA, Los Alamitos, CA, IEEE Comt. Soc., Oct. 3, 1993, pp. 482-485, XP010134571 (Oct. 3-6, 1993).

Automatic Target Recognition, Colorado State University & USAF, http://www.cs.colostate.edu/cameron/applications.html, pp. 1-3.

Babb, J., et al., "Parallelizing applications into silicon", © EEE, Publ. No. 0-7695-0375-6, pp. 70-80 (1999).

Barthel, D., "PVP a Parallel Video coProcessor", Hot Chips IX, pp. 203-210 (Aug. 25-26, 1997).

Bertin, P., et al. "Programmable Active Memories: A Performance Assessment", © Massachusetts Institute of Technology, pp. 88-102 (1993).

Bittner, R., et al., "Computing Kernels Implemented with a Wormhole RTR CCM", © IEEE Publ. No. 0-8186-8159-4/97, pp. 98-105 (1997).

Buell, D. , et al., "Splash 2: FPGAs in a Custom Computing Machine—Chapter 1—Custom Computing Machines: An Introduction", pp. 1-11, http://ww.computer.org/espress/catalog/bp07413/spls-chl.html (originally believed published in J. of Supercomputing, vol. IX 1995, pp. 219-230).

Caliga, D., et al., "Delivering Acceleration: The Potential for Increased HPC Application Performance Using Reconfigurable Logic", SRC Computers, Inc., pp. 20 (Nov. 2001).

Callahan, T. J., et al., "Adapting Software Pipelining for Reconfigurable Computing", University of California at Berkeley, No. 17-19, 2000, pp. 8.

Callahan, T. J., et al., "The Garp Architecture and C. Compiler", Computer, pp. 62-69 (Apr. 2000).

Casselman, S., "Virtual Computing and the Virtual Computor", © IEEE, Publ. No. 0-8186-3890-7/93, pp. 43-48 (Apr. 1993).

Chan, P., et al., "Architectural tradeoffs in field-programmable-device-based computing systems", © IEEE Publ. No. 0-8186-3890-7/93, pp. 162-161 (Apr. 1993).

Chien, A.A., et al., "Safe and Protected Execution for the Morph/AMRM Reconfigurable Processor," IEEE, pp. 1-13 (Apr. 1, 1999).

Chodowiec, P. et al., "Fast Implementation of Secret-Key Block Ciphers Using Mixed Inner-and outer-Round Pipelining" George Mason University, pp. 9 (Feb. 11-13, 2001).

Clark, D., et al., "Supporting FPGA microprocessors through retargetable software tools", © IEEE, Publ. No. 0-8186-7548-9/96, pp. 195-103 (Apr. 1996).

Cuccaro, S., et al., "The CM-2X: a hybrid CM-2/Xilink prototype", © IEEE, Publ. No. 0-8186-3890-7/93, pp. 121-130 (Apr. 1993).

Culbertson, W. Bruce, et al., "Defect Tolerance on the Teramac Custom Computer", © IEEE Publ. No. 0-8186-8159-4/97, pp. 116-123 (1997).

Culbertson, W. Bruce, et al., "Exploring Architectures for Volume Visualization on the Teramac Custom Computer", © IEEE Publ. No. 0-8186-7548-9/96, pp. 80-88 (Apr. 1996).

Dave, B. "Crusade: Hardware/Software Co-Synthesis of Dynamically Reconfigurable Heterogeneous Real-Time Distributed Embedded Systems" , ACM Proc. Conf on design, automation and Test in Europe Conference and Exhibition, pp. 97-104, ISBN 0-7695-0078-1 (Mar. 9-12, 1999).

Dehon, A., "DPGA-Coupled Microprocessors: Commodity ICs for the Early $21^{st}$Century" © IEEE, Publ. No. 0-8186-5490-2/94, pp. 31-39 (Apr. 10-13, 1994).

DeHon, A., et al., "MatrixA Reconfigurable Computing Device With Configurable Instruction Distribution", Hot Chips IX, Stanford, California, Reinventing Computing, MIT Artificial Intelligence Laboratory, pp. 9-18 (Aug. 25-26, 1997).

DeHon, A., "Comparing Computer Machines", University of California at Berkeley, Proceedings of SPIE Conference on Configurable Computing: Technology and Applications, SPIE, 3526: pp. 124-133 (Nov. 2-3, 1998).

DeHon, A., "The Density Advantage of Configurable Computing", IEEE Publ. No. 0018-9162/11, pp. 41-49 (Apr. 2000).

Deshpande, D., et al., "Hybrid Data/Configuration Caching for Striped FPGAs", © Publ. No. 0-7695-0375-6, pp. 294-295 (1999).

Dhaussy, P., et al., "Global control synthesis for an MIMD/FPGA machine", © IEEE, Publ. No. 0-8186-5490-2/94, pp. 72-81 (Apr. 10-13, 1994).

Elliott, D., et al., "Computational Ram: Memory-SIMD Hybrid and Its Application to DSP", © IEEE, Publ. No. 0-7803-0246-X/92, pp. 30.6.1-30.6.4 (May 3-6, 1992).

Fortes, J., et al. "Systolic Arrays, A Survey of Seven Projects", © IEEE, Publ. No. 0018-9162/87/0700-0091, pp. 91-103 (Jul. 1987).

Gibbs, W., "Blitzing Bits", © *Scientific American Presents*, pp. 57-61 (1999).

Gokhale, M., et al. "Processing in Memory: The Terasys Massively Parallel PIM Array", © IEEE Publ. No. 0018-9162/95, vol. 28, issue 4, pp. 23-31 (Apr. 1995).

Goldstein, Seth Copen, et al., "PipeRench: A Reconfigurable Architecture and Compiler", IEEE Publ. No. 0018-9162/00, pp. 70-76 (Apr. 2000).

Gonzales, R., "Configurable and extensive processors change system design", http://www.hotchips.org/archives/hc11/, Hot Chips 11 Tutorials, pp. 1-23 (Aug. 15-17, 1999).

Graham, P., et al., "FPGA-based sonar processing", FPGA 1998 International Symposium on Field Programmable Gate Arrays, © ACM ISBN 0-89791-978-5/98, pp. 201-208 (1998).

Gross, T., et al., "Compilation for a High-Performance Systolic Array", *Sigplan Notices USA*, XP002418625, ISBN 0-89791-197-0, 21(7): pp. 27-38 (Jul. 1986).

Gunther, B., et al., "Assessing Document Relevance with Run-Time Reconfigurable Machines", © IEEE Publ. No. 0-8186-7548-9/96, pp. 10-17 (Apr. 17-19, 1996).

Hagiwara, H., et al., "A Dynamically microprogrammable computer with low-level parallelism", © IEEE, Publ. No. 0018-9340/80/07000-0577, C-29(7): pp. 577-594 (Jul. 1980).

Hammes, J.P., et. al., "The SA-C Compiler Dataflow Description", Colorado State University, pp. 1-25 (Jun. 21, 2001).

Hammes, J. P. "Compiling SA-C to Reconfigurable Computing Systems", Colorado State University, Department of Computer Science, pp. 1-164 (Summer 2000).

Hammond, L., et al., "The Stanford Hydra CMP", Hot Chips 11 Tutorials, pp. 1-22 (Aug. 15-17, 1999).

Hartenstein, R., "A Decade of Reconfigurable Computing: A Visionary Retrospective", Proceedings of Design, Automation, and Test in Europe, IEEE Computer Society, Publ. No. 0-7695-0993-2, pp. 1-8 (2001).

Hartenstein, R.W., et al., "A General Approach in System Design Integration Reconfigurable Accelerators", http://xputers.informatik.uni-kl-de/papers026-1.html, Innovative Systems in Silicon, 1996 Proceedings, Eighth Annual IEEE International Conference, IEEE Publ. No. 0-7803-3639-9, pp. 16-25 (Oct. 9-11, 1996).

Hartenstein, R.W., et al., "A Synthesis System for Bus-based Wavefront Array Architectures", Proceedings, International conference on Application-Specific Systems, Architecture and Processors, Proceedings of the 1996 International Conference on Application-Specific Systems, Architectures and Processors, IEEE Publ. No. 1063-6862/96, pp. 274-283 (1996).

Hartenstein, R.W., et al., A reconfigurable data-driven ALU for Xputers, © IEEE Publ. No. 0-8186-5490-2, pp. 139-146 (Apr. 10-13, 1994).

Hasebe, A., et al., "Architecture of SIPS, a real time image processing system", © IEEE Publ. No. CH2603-9/88/0000/0621, pp. 621-630 (May 25-27, 1998).

Hauser, J., et al., "GARP: a MIPS processor with a reconfigurable co-processor", © IEEE Publ. No. 0-8186-8159-4/97, pp. 12-21 (Apr. 16-18, 1997).

Hayes, J., et al., "A microprocessor-based hypercube, supercomputer", © IEEE Publ. No. 0272-1732/86/1000-0006, 6(5): pp. 6-17 (Oct. 1986).

Haynes, S. D., et al., "Video Image Processing with the Sonic Architecture", Sony Broadcast & Professional Europe, Imperial College, University of London, IEEE Publ. No. 0018-9162/00, pp. 50-57 (Apr. 2000).

Herpel, H. J., et al., "A Reconfigurable Computer for Embedded Control Applications", FPGAs for Custom Computing Machines, 1993, Proceedings, IEEE Workshop, IEEE, Publ. No. 0-8186-3890-7/93, pp. 111-120 (Apr. 5-7, 1993).

Hogl, H., et al., "Enable++: A Second Generation FPGA Processor", FPGSs for Custom Computing Machines, 1995 Proceedings, IEEE Symposium on, © IEEE, Publ. No. 0/8186-7086-X/95, pp. 45-53 (Apr. 19-21, 1995).

Hoover, C., et al., "San Diego Supercomputer Center, TimeLogic and Sun Validate Ultra-Fast Hidden Markov Model Analysis", pp. 1-3 (May 8, 2002).

Hwang, K., "Computer Architecture and Parallel Processing", Data Flow Computers and VLSI Computations, McGraw Hill, 10: pp. 732-807, XP-002418655 (1985).

IEEE 100: *The Authoritative Dictionary of IEEE Standards Terms, 7th Edition, Standards Information Network*, p. 874 (2000).

Jean, J., et al., "Dynamic Reconfiguration to Support Concurrent Applications", © IEEE, Publ. No. 0018-9340/99, 48(6): pp. 591-602 (Jun. 1999).

Kastrup, B., et al., "Concise: A Compiler-Driven CPLD0-Based Instruction Set Accelerator", © IEEE, Publ. No. 0-7695-0375-6, 10 pages (1999).

King, W., et al., "Using MORRPH in an Industrial Machine Vision System", © IEEE, Publ. No. 08186-7548-9/96, pp. 18-26 (Apr. 1996).

Li, et al., "Configuration Prefetching Techniques for a Partial Reconfigurable Coprocessor with Relocation and Defragmentation", ACM FPGA, ISBN 1-58113-452-5, pp. 187-195 (Feb. 24-26, 2002).

Mangione-Smith, W. H., et al., Configurable Computing: The Road Ahead, In Proceedings of the Reconfigurable Architectures Workshop (RAW'97), pp. 1-15 (1997.

Manohar, S., et al., "A Pragmatic Approach to Systolic Design", © IEEE, Publ. No. CH2603-9/88/0000/0463, pp. 463-472 (May 1998).

Mauduit, N., et al., "Lneuro 1.0: A Piece of Hardware LEGO for Building Neural Network Systems," © IEEE, Publ. No. 1045-9227/92, pp. 414-422 (May 1992).

McConnell, R., "Massively Parallel Computing on the FUZION Chip", 1999 Hot Chips 11 Tutorials, http://www.hotchips.org/archives/hc11/, pp. 83-94 (Aug. 15-17, 1999).

McShane, E., et al., "Functionally Integrated Systems on a Chip: Technologies, Architectures, CAD Tools, and Applications", © IEEE, Publ. No. 8-8186-8424-0/98, pp. 67-75 (Oct. 22-24, 1997).

Mencer, O., et al., "PAM-Blox: High Performance FPGA Design for Adaptive Computing" © IEEE, Conference Paper, INSPEC Abstract Nos. B9811-1256B-044, C9811-5210-010, pp. 167-174 (Apr. 15-17, 1998).

Mirsky, E. A., "Coarse-Grain Reconfigurable Computing", Unpublished Master's Thesis, Massachusetts Institute of Technology, pp. 1-161 (Jun. 11, 1996).

Mirsky, E., et al., "MATRIX: A Reconfigurable Computing Architecture with Configurable Instruction Distribution and Deployable Resources", © IEEE, Publ. No. 0-8188-7548-9/96, pp. 157-166 (Apr. 17-19, 1996).

Miyamori, T., et al., "REMARC: Reconfigurable Multimedia Array Coprocessor", *IEICE Transactions on Information and Systems, Information & Systems Society*, Tokyo, JP, E82-D(2): pp. 389-397, XP000821922 (Feb. 1999).

Miyamori, T., et al., "A Quantitative Analysis of Reconfigurable Coprocessors for Multimedia Applications", © IEEE Conference Paper, ISBN: 0-8186-8900-5, pp. 1-10 (1998).

Morley, R. E., Jr., et al., "A Massively Parallel Systolic Array Processor System", © IEEE, Publ. No. 0-8186-8860-2, pp. 217-225 (May 25-27, 1998).

Motomura, M., et al., "An Embedded DRAM-FPGA Chip with Instantaneous Logic Reconfiguration", © IEEE, Publ. No. 0-8186-8900-5/98, pp. 264-266 (1998).

Muchnick, S. S., "Advanced Compiler Design and Implementation", *Morgan Kaufmann Publishers*, pp. 217-266 (1997).

Patterson, D., et al., "A Case for Intelligent DRAM: IRAM", Hot chips VIII, pp. 75-94 (Aug. 19020, 1996).

Peterson, J., et al., "Scheduling and partitioning ANSI-C programs onto multi-FPGA CCM architectures", © IEEE, Publ. No. 0-8186-7548-9/96, pp. 178-187 (Apr. 17-19, 1996).

Platzner, M., "Reconfigurable Accelerators for Combinatorial Problems", Computer pp. 58-60 (Apr. 2000).

Purna, K., et al., "Temporal Partitioning and Scheduling Data Flow Graphs for Reconfigurable Computers", © IEEE Transaction on Computers, IEEE Publ. No. 0018-9340/99, 48(6): pp. 579-590 (Jun. 1999).

Ratha, N.K., et al., "An FPGA-based Point Pattern Matching Processor with Application to Fingerprint Matching", Michigan State University, Proceedings of the Computer Architectures for Machine Perception (CAMP), Department of Computer Science, pp. 8 (1995).

Rauchwerger, L., et al., "The LRPD Test: Speculative Run-Time Parallelization of Loops with Privatization and Reduction Parallelization", IEEE Transaction on Parallel and Distributed Systems, IEEE Service Center, Los Alamitos, CA, 10(2): pp. 160-180, XP0000908318 (Feb. 1999).

Rosenberg, J.M., Dictionary of Computers, Information Processing & Telecommunications, *John Wiley & Sons*, 2ed. p. 496 (1984).

Rupp, C., et al., "The NAPA adaptive processing architecture", © *the Authors*, pp. 1-10 (1998).

Saito, O. et al., "A 1M Synapse Self Learning Digital Neural Network Chip", Solid-State Circuits Converence, 1998, Digets of Technical Paper, © IEEE Publ. No. 0-7803-4344/1/98, pp. 94-95 (Feb. 5-7, 1998).

Schmit, H., "Incremental Reconfiguration for Pipelined Applications" © IEEE, Publ. No. 0-8186-8159-4/97, pp. 47-65 (Apr. 16-18, 1997).

Schott, B., et al., "Architectures for System-Level Applications of Adaptive Computing", © IEEE, pp. 270-271 (1999).

Sitkoff, N., et al., "Implementing a Genetic Algorithm on a Parallel Custom Computing Machine", Publ. No. 0-8186-7086-X/956, pp. 180-187.

Stone, H., "A Logic-In-Memory Computer", © IEEE Transactions on Computers, pp. 73-78, Jan. 1970.

Tangen, U., et al., "A Parallel Hardware Evolvable Computer POLYP Extended Abstract", © IEEE, Publ. No. 0-8186-8159/4/97, pp. 238-239 (Apr. 16-18, 1997).

Thornburg, M., et al., "Transformable Computers", © IEEE, Publ. No. 0-8186-5602-6/94, pp. 674-679 (Apr. 26-29, 1994).

Tomita, S., et al., "A Computer Low-Level Parallelism QA-2", © IEEE, Publ. No. 0/0884-7495/86/0000/0280, pp. 280-289 (1986).

Trimberger, S., et al., "A Time-Multiplexed FPGA", © IEEE, Publ. No. 0-8186-8159-4/97, pp. 22-28 (Apr. 16-18, 1997).

Ueda, H., et al., "A Multiprocessor System Utilizing Enhanced DSP's for Image Processing", © IEEE, Publ. No. CH2603-9/88/0000/0611, pp. 611-620 (May 25-27, 1988).

Vemuri, Ranga, et al., "Configurable Computing: Technology and Applications", University of Cincinnati and Synopsys Inc., IEEE, Apr. 2000, pp. 39-40.

Verbauwhede, I., et al., "The Happy Marriage of Architecture and Application in Next-Generation Reconfigurable Systems", ACM CF, ISBN: 1-58113-741-9, pp. 363-376 (Apr. 14-16, 2004).

Villasenor, J., et al., "Configurable Computing", © *Scientific American*, pp. 66-71 (Jun. 1997).

Wang, Q., et al., "Automated Field-Programmable Compute Accelerator Design Using Partial Evaluation", © IEEE, Publ. No. 0-8186-8159-4/97, pp. 145-154 (Apr. 16-18, 1997).

Wirthlin, M., et al., "A Dynamic Instruction Set Computer", © IEEE, Publ. No. 0-8186-7086-X/95, pp. 99-107 (Apr. 19-21, 1995).

Wirthlin, M., et al., "The Nano Processor: A Low Resource Reconfigurable Processor", © IEEE, Publ. No. 0-8186-5490-2/94, pp. 23-30 (Apr. 10-13, 1994).

Wittig, R., et al., "One Chip: An FPGA Processor With Reconfigurable Logic", © IEEE Publ. No. 0-8186-7548-9/96, pp. 126-135 (Apr. 17-19, 1996).

Wu, Y., et al., "Better Exploration of Region-Level Value Locality with Integrated Computation Reuse and Value Prediction", Proceedings of the $8^{th}$ International Symposium on Computer Architecture, ISCA 2001, Goteberg, Sweden, International Symposium on Computer Architecture (ISCA), Los Alamitos, CA, IEEE, Comp. Soc., US, pp. 93-103, XP010552866 Jun. 30-Jul. 4, 2001.

Yamauchi, T., et al., "SOP: A Reconfigurable Massively Parallel System and Its Control-Data Flow Based Compiling Method", © IEEE, Publ. No. 0-8186-7548-9/96, pp. 148-156 (Apr. 1996).

Yun, Hyun-Kyu, et al., "A Distributed Memory MIMD Multi-Computer With Reconfigurable Custom Computing Capabilities", Brown University, pp. 8-13 (Dec. 10-13, 1997).

\* cited by examiner

METHODS AND SYSTEMS FOR COMPUTING PLATFORM

RELATED APPLICATIONS

This application claims the benefit of U.S. Provisional Application No. 60/741,680, filed on Dec. 2, 2005, the entire teachings of which are incorporated herein by reference.

FIELD OF THE INVENTION

The present invention relates generally to methods and systems for providing a unique and alternative computing platform operable to address the needs of high performance computing areas. Financial industry is just one example of such a field where there exists such a need for high performance computing. Currently, high performance problems are solved through computer clusters, scalable grids etc. whose costs increase exponentially as the number of units involved in the processing increase.

BACKGROUND OF THE INVENTION

At present, all industries utilize a variety of extremely costly computer platforms to address certain computationally-intensive solutions such as numerical analysis, monte-carlo simulations and related problems. For example Value at Risk (VaR) problems are addressed in the finance industry through deployment of very powerful (and expensive) services employing multiple CPU's and a number of multi-threaded programs that utilize these CPU's. The disadvantage to this process is the fact that as the number of CPU's are increased beyond a critical number (e.g., eight), the costs of such a server and associated services increase exponentially. At the same time, the need for "number crunching" continues to increase due to (a) an increasing number of investment managers; (b) an increasing number of portfolios per investment manager; (c) the kind and the volumes of complex derivatives and (c) an increase in available historical data.

It is desirable to provide methods and systems that overcome this disadvantage, as well as a solution that can be applicable to any industry and can be utilized by accessing the computing power through widely known programming languages such as C, C++, Java, and Ruby, with potential gains of 10-200 times performance improvement for ⅓rd the cost. The details in the following sections consider Financial Industry as an example to explain the benefits of the present invention.

SUMMARY OF THE INVENTION

The present invention addresses the foregoing problems of the prior art. In particular, the present invention provides a computer method and apparatus for analytical financial computing (computational processing) and more generally for a hardware accelerated numerical system and analysis.

In a preferred embodiment, the invention analytical computing apparatus comprises (a) one or more analytical processing units and (b) an application interface enabling use of respective desired ones of the analytical processing units by one or more computer application programs. Different computer application programs utilize different ones of the analytical processing units, and each computer application program performs a respective analytical computation. In accordance with one aspect of the present invention, each processing unit is formed of a respective field programmable gate (FPGA) array and performs a respective analytical operation.

In other embodiments, a computer system comprises a mother board hosting a multiplicity of processing cards. Each card carries respective analytical processing units (FPGA's). One subset of the FPGA's provides numerical algebra operations (e.g., matrix mathematics, eigen values, eigen vectors, etc.) and linear equations. Another subset of the FPGA's provides statistical operations (e.g., random number generator, variance-covariance matrix construction, maximum likelihood estimator, etc.) A third subset of the FPGA's provides real time matrix operations for data stream (continuous) and time rate data feeds (e.g., foreign exchange rate estimator, interest rate estimator, etc.)

In accordance with one aspect, the present invention facilitates high performance computing (ranging from ten to two hundred times performance improvement and approximately one-third of the "hard" costs for an equivalent grid computing solution) in three fundamental areas:

1) Numerical algebra comprising entire matrix operations including eigen value decomposition and a linear equation solver. This portion unto itself can be considered as "numerical recipes in hardware".

2) Monte Carlo simulations and general equilibrium model

3) Real time high frequency data (trades and quotes, TAQ, data in financial industry) normalization and associated trigger generation.

Applicant applies the above three fundamental technology blocks to the following functional areas within the financial industry (as a sample set):

1) Identification of correlation and cointegration among different instruments (pairs, groups) and subsequent trigger generation based on real time data 2) Instantaneous capability of performing complex calculations such as marginal and incremental value at risk 3) Interpolation results of TAQ data for further analysis 4) Prediction of interest rate paths and correspondingly, currency exchange rates 5) Algorithmic trading 6) Complex derivative pricing The above functional areas are of interest to and part of the responsibilities of business units such as Quantitive research;

High frequency trading;

Trading desks; and

Risk management in traditional asset management firms, hedge funds, banks (credit risk) and insurance companies and the like.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention overcomes the disadvantages of prior systems by using FPGA's (Field-Programmable Gate Arrays) to solve financial industry analytical problems and related computational processing. An FPGA is a semiconductor device containing programmable logic components and programmable interconnects. The programmable logic components can be programmed to duplicate the functionality of basic logic gates (such as AND, OR, XOR, INVERT) or more complex combinatorial functions such as decoders or simple math functions. In most FPGA's these programmable logic components (or logic blocks, in FPGA parlance) also include memory elements, which may be simple flip-flops or more complete blocks of memories.

A hierarchy of programmable interconnects allows the logic blocks of an FPGA to be interconnected as needed by the system designer, somewhat like a one-chip programmable breadboard. These logic blocks and interconnects can be programmed after the manufacturing process by the customer/designer (hence the term "field-programmable") so that the FPGA can perform whatever logical function is needed.

FPGA's are commercially available, for example, from Altera Corporation of San Jose, Calif.

Figure 1:
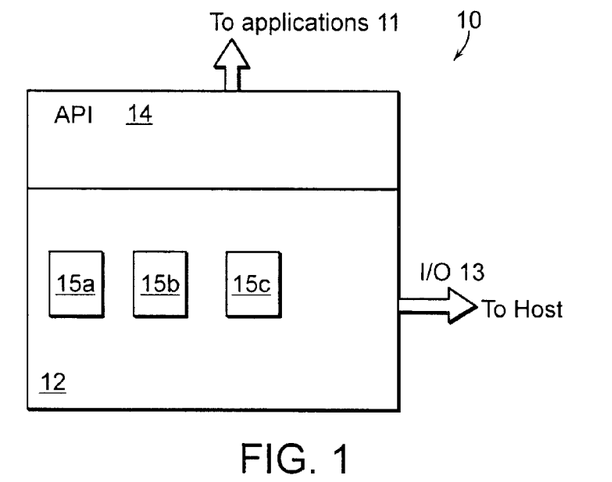
FIG. 1 is a schematic diagram showing an overview of a system according to the present invention.

In accordance with the present invention, FPGA's are employed in a financial industry analytical computing or processing system 10 as illustrated in FIG. 1. The illustrated system 10 is formed of (a) a PCI card or board 12 hosting one or more analytical processing units (or building blocks) 15; and (b) an application interface 14 built using any common programming language such as Java, C++, Jscript, etc., that interacts between industry applications 11 desired and the PCI card 12.

The analytical processing units or building blocks 15 are FPGA's programmed to solve different financial industry problems of interest (e.g., analytical financial problems). In one embodiment, there are three categories or sets of analytical processing units/building blocks 15 implemented on the FPGA's using known techniques, processor routines and/or algorithms. One category or subset of FPGA building blocks 15 performs or otherwise implements linear algebra (algebraic) operations such as functional matrix operations and linear equation solving. Another category or subset of building blocks/FPGA's 15 provides statistical operations such as random number generators, variance-covariance matrix construction and correlation matrix construction, maximum likelihood estimation and non-stationary correlator among a time series. Preferably a third category or subset of building blocks/FPGA's 15 implements real-time matrix building.

With regard to the linear algebra processing units 15 included are FPGA's that respectively implement matrix addition, matrix subtraction, matrix transpose, matrix trace, matrix extraction (as to form or compute a minor, adjoin and cofactor), matrix multiplication (including inner product and direct/outer product), matrix determinant (indicating if singular), matrix inverse (if not singular), matrix decomposition (including solving eigen-values and eigen-vectors), matrix inertial and linear equation solvers.

In the preferred embodiment, a scalar is a 1 by 1 matrix (0-dimension tensor), and a vector is a 1 by N or N by 1 matrix (1-dimension tensor) and a planar matrix has 2-dimension tensor. Further the matrix inertial processing unit 15 outputs three numbers, namely the number of eigen values >0, the number of eigen values=0 and those <0. The matrix multiplication preferably follows the Winograd or similar suitable method. In matrix decomposition, use of Jacobian matrixes is preferred and output includes the diagonal, an eigen value matrix and a matrix of the corresponding eigen vectors. The decomposition may be performed using SVD (singular value decomposition), Cholesky's algorithm or the like. Using SVD the output is U, B, V where $A=U^TBV$. Assuming a covariance matrix is already built, there will be situations whereby a new row needs to be added to the covariance matrix that corresponds to a new instrument and subsequently SVD decomposition is applied again.

Further the linear equation solvers preferably include implementation of Gauss-Jordan algorithm, Gauss elimination, Jordan elimination and various approximation algorithms (iterations, Seidal, relaxation and the like).

With regard to the statistical operations implemented by respective FPGA's 15, preferably the random number generators generate an output in a matrix format with variables as rows and realizations as columns, or vice versa. There is a uniform distribution within (0,1) and a standard normal distribution (mean=0, standard deviation=1, skewness=0, kurtosis=3). In the variance-covariance and correlation (paired correlation, not the one through SVD) matrix construction, the exponential-weighted moving average algorithm is preferably used as follows.

To arrive at a variance-covariance matrix $\Sigma$, the element of the matrix is written as:

$$\sigma_{i,j,T}^2 = \frac{1-\lambda}{1-\lambda^{N+1}} \sum_{t=0}^{N} \lambda^t r_{i,T-t} r_{j,T-t} \qquad (1)$$

When the decay factor $\lambda$ is set to 0.9, one needs roughly 20-day historical data; for $\lambda=0.99$ roughly 250-days historical data is needed, depending upon resolution desired.

Use the SVD decomposition to get the correlation matrix C, i.e., $\Sigma=C^TC$, where C is from SVD (theoretically the same as principal component decomposition, for $\Sigma$ is real and symmetric matrix). $C=\Lambda^{1/2}U$, where $\Lambda$ is the eigen-value matrix and U is the eigen-vector matrix. Note: Here, returns are log returns, i.e., $r=\ln(1+r_{total})$.

In the preferred embodiment, the maximum likelihood estimator (processing unit 15) first estimates four parameters k, $\theta$, $\sigma$, $\gamma$ using the general equilibrium model detailed below. Second, when all four parameters are decided, the maximum likelihood estimator starts iterations day by day to simulate future interest rate paths using a random matrix.

Input includes:

(a) Historical interest rates (grid-level: 1 month, 3 month, 2 year, 5 year, 10 year) is a G×N matrix where G is the number of grid levels and N is the number of historical rates. This is for purposes of illustration, not limitation; G could be larger.

(b) Range and increments for the four parameters k, $\theta$, $\sigma$, $\gamma$ is (4*3=12)

(c) Number of forecast horizon days is D (d) Number of simulations is S (e) Default value for $\Delta t$ is 1/365, i.e., year as the unit Output is then:

(i) A G×D1 matrix, each row representing the grid level, and D1 representing the mean of expected value from simulations.

(ii) A G×D2 matrix, each row representing the grid level, and D2 representing the standard deviation of expected value from simulations.

(iii) Optionally a list (of K elements) G×S matrices.

General Equilibrium Model for interest rates forecast modeling

For a single term interest rate, $$r_{t+1} - r_t + k(\theta - r_t)\Delta t + \sigma r_t^\gamma z \sqrt{\Delta t} \quad (2)$$

where one needs to evaluate the four parameters k, θ, σ, γ, using historical data and maximum likelihood estimation. Note the correlated random number matrix z is a linear combination of standard normal variables, when considering the correlations among different term interest rates. That is, r should be a vector when representing a term structure, and each term has its own four parameters of k, θ, σ, γ.

Z is calculated as $U^T$*SQRT(B)*Normal distribution, i.e., correlation matrix decomposed from SVD decomposition multiplied by normal random number matrix.

Maximum likelihood estimation algorithm:
From equation (2), one knows:

The expectation:

$$E[r_{t+1}] = r_t + k(\theta - r_t)\Delta t \quad (3)$$

The standard deviation:

$$\text{StdDev}[r_{t+1}] = \sigma r_t^\gamma \sqrt{\Delta t} \quad (4)$$

Then the probability $$p[r_{t+1}] = \frac{e^{-\frac{(r_{t+1} - E[r_{t+1}])^2}{2(StdDev[r_{t+1}])^2}}}{\sqrt{2\pi(StdDev[r_{t+1}])^2}} \quad (5)$$

Trying N historical days, one gets a joint probability JP=p $[r_{t-N}]p[r_{t-N+1}] \ldots p[r_{t-1}]$, then select the combination of k, θ, σ, γ, which maximize JP.

It is noted that the above processing needs different seeds for each of the G grids, and a G X G covariance matrix needs building. If one has a 5×10,000 matrix for day 1, for the next day create a new random matrix of 5×10,000 (or reuse a previous random matrix in some way such as by shuffling) and use the simulated previous day grid values (G r values) to get the next day simulated results.

The goal is to have, for each day, for each grid, all the 10,000 simulated results, arranged in matrix format—a list of matrices. For example, assuming 30 days, one should see 30×5×100,000 double precision numbers.

Further, an example embodiment of the non-stationary correlation among time series processing unit 15 follows the algorithm (code) in Appendix I.

With regard to real time matrix building operations, respective building blocks FPGA's 15 implement Black-Scholes algorithm (routine or calculation) for option pricing, an algorithm for pricing mortgage backed securities and an algorithm for predicting interest rates. In the preferred embodiment, these FPGA's 15 receive as input real time TAQ (Trades and Quotes) data streams, time rate data feeds (e.g., from Reuters Company) and similar continuous data. Other input includes historical interest rates and/or historical foreign exchange rates. Output then includes a matrix of future foreign exchange rates and/or simulated future interest rates. Preferably future exchange rates are estimated through interest rates as follows.

Exchange Rates Modeling $$\text{forward}(DC|FC) = \text{spot}(DC|FC)\left(\frac{1+r_D}{1+r_F}\right) \quad (6)$$

DC/FC means the ratio of domestic currency to foreign currency, and $r_D$ and $r_F$ mean the domestic and foreign term interest rates, respectively.

One knows spot exchange rate and uses the simulated results from equation (3) above for both domestic and foreign interest rates, so can arrive at future arbitrage-free exchange rates. If one cannot simulate the foreign interest rates because of data availability issues, then one has to reasonably estimate it.

Implied Volatility Modeling

If one has sufficient option pricing data, one can use Black-Scholes model to calculate the expected implied volatility. If not, one uses historical underlying return data and a standard deviation measure on it as the estimate of volatility as above in Equation (1).

Returning to FIG. 1, using the processing units/building blocks 15, different application programs 11 of interest (e.g., financial applications) are built. In particular, known algorithms are used in conjunction with the present invention FPGA building blocks 15 to implement the following applications 11:

Portfolio VaR (Value at Risk) calculations
Portfolio Optimization
Alpha Back testing
Algorithm trading
Monte Carlo simulation Other example financial applications utilizing building blocks 15 include multi-variant regression analysis and other analytical financial programs or processing routines.

Restated, each financial application 11 needs different ones of the FPGA building blocks 15. API layer 14 enables a programmer to utilize the appropriate FPGA building blocks 15 to build a desired application 11. Alternatively, the application 11 of interest may be programmed or "burned into" one or more of the FPGA's 15 on the PCI card/board 12.

An example building block 15 is a pure random number generation model that can be used in a Monte Carlo simulation for example. Application 11 may utilize the random number output in conjunction with some matrix algebra that may vary from application to application in solving a specific problem. Initially, by way of non-limiting example, the following focuses on one specific problem, Value at Risk (VaR) for a number of portfolios, based on a covariance matrix.

Step One—Random Number Generation

Random number generation in accordance with the present invention has two parts:

1. A C program that generates these random numbers—it may be useful to generate these random numbers based on different algorithms (e.g., the KCM algorithm) that are reflected in different C programs. (See, e.g., Chapman, "Fast integer multipliers fit in FPGAs," *EDN Magazine*, May 1994; and Boullis, et al., "Some Optimizations of Hardware Multiplication by Constant Matrices," both of which are incorporated herein by reference as if set forth in their entireties).

and

2. A number of random sequences—close to 14,000 sequences, with each sequence being around 100,000 observations.

There is no data involved in this process. All that is required is a simple C program that can be modified from application to application. A single program can be written with different functions that can be called, based on the argument (variable values, coefficients, etc.) that is passed.

Step Two—Covariance Matrix Generation—Once a Day

Data Size is:
  6 GB—worst case (2.5 MB (each day for 80,000 securities)×10 (number of years)×252 (number of days));
  1 GB—best case (universe of securities is limited to about 14,000, which is more of the norm and more practical).

Program: Assuming that the universe of securities is limited to 14,000, the end result is a 14,000×14,000 matrix with each cell representing a double. Each cell is again created through a C program, and the process can be run in parallel since computation of a single cell in the above matrix is independent and all computations of cells use the above data set.

Step Three—Covariance Matrix Decomposition—Once a Day

A minimum of 10 runs of a C program that decomposes the above matrix—resulting in a 14,000×14,000 matrix each time. Each run also stores the decomposed matrices in a suitable memory, data store or the like.

Step Four—Portfolio Analysis

For portfolio analysis there are two possible scenarios:
  1. batch mode;
  2. interactive.

In both cases, inputs is a list of securities and their corresponding active weights. A C program uses data from Step 1, Step 2 and Step 4 to compute and generate portfolio analytics. In batch mode, analytics is done for multiple portfolios in parallel.

The above Steps 1 through 4 are essentially a definition of a specific problem that the present invention addresses through an FPGA (building blocks 15) solution. Though Steps 2 through 4 may change from applied problem to problem, Step 1 can be used as the common denominator for many such problems. Any design should consider flexibility in changes to C programs in all of the above steps in general and specifically to Step 1 in particular.

Pseudo code further illustrating the API layer 14 interaction with FPGA building blocks 15 and example financial applications 11 (specifically a multivariable attribution program and a VaR program calculation in Java) follow.

```
                    KBSFPGAInterface.java
package com.kbs.fpga;
public interface KBSFPGAInterface
{
    public DataSet UploadSecurityData(Vector securities, Matrix secReturns);
    public Matrix GenerateCovarianceMatrix(Vector securities, DataSet dataset);
    public Matrix GenerateRandomMatrix(int numOfRiskFactors, int numOfScenarios);
    public Matrix DecomposeCovarianceMatrix(Matrix covarianceMatrix);
    public Matrix GetReturnMatrix(Matrix decomposedCovarianceMatrix,
    Matrix randomMatrix);
    public Matrix MultiplyMatrix(Matrix lhs, Matrix rhs);
    public Vector MultiVariateRegression(Matrix observations,
        Vector targets);
    public Matrix GaussJordanSolver(Matrix coefficients, Matrix solutions);
}
                    mvattribution.java
import com.kbs.fpga.*;
public class mvattribution
{
    public static void main(String args[ ])
    {
        /*
        * Assume we have the observations for the various factors
(independent variables) and the target (dependent variable) available
        * Also, assume there is an implementation for the
KBSFPGAInterface called KBSFPGAInterfaceImplementation
        */
        KBSFPGAInterface fpgaInterface = (KBSFPGAInterface) new
KBSFPGAInterfaceImplementation( );
        Matrix observations =
Vision.getAlphaFactorObservations( );
        Vector targets = Vision.getRegressionTargets( );
        /* Multivariate Regression involves Matrix inversion routines */
        Vector coefficients =
fpgaInterface.MultiVariateRegression(observations, targets);
    }
}
                    var.java
import com.kbs.fpga.*;
public class var
{
    public static void main(String args[ ])
    {
        /*
        * Assume security data and return data for securities are
available from some repository, say - Vision
        * Also, assume there is an implementation for the
KBSFPGAInterface called KBSFPGAInterfaceImplementation
        */
        KBSFPGAInterface fpgaInterface = (KBSFPGAInterface) new
KBSFPGAInterfaceImplementation( );
        Vector securities = Vision.getSecurities( );
        Matrix secReturns = Vision.getSecReturnDataFor
(securities);
        DataSet dataset = fpgaInterface.UploadSecurityData
(securities, secReturns);
        Vector portSecurities =
Vision.getSecuritiesInPortfolio("MY_PORTFOLIO");
        Matrix covarianceMatrix =
fpgaInterface.GenerateCovarianceMatrix(portSecurities, dataset);
        Matrix zMatrix =
fpgaInterface.GenerateRandomMatrix(portSecurities.length, 100000);
        Matrix decomposedCovarianceMatrix =
fpgaInterface.DecomposeCovarianceMatrix(covarianceMatrix);
        Matrix returnMatrix =
fpgaInterface.GetReturnMatrix(decomposedCovarianceMatrix, zMatrix);
    }
}
```

Further examples of pseudo code in other programming languages for building blocks 15, API layer 14 and applications 11 are:

```
                    kbsfpga.h
#ifndef __kbsfpga_h_included__
#define __kbsfpga_h_included__
/*
* Used to upload historical return data for a set of securities.
* Returns a handle to this security dataset.
*/
void* KBSFPGA_UploadSecurityData(Vector securities, Matrix secReturns);
/*
* Used to generate the covariance matrix for securities in the dataset.
```

-continued

```
 * This covariance matrix is used as a lookup by the FPGA.
 * Returns the 'sub-matrix' of covariances for securities.
 */
void* KBSFPGA_GenerateCovarianceMatix(Vector securities, void*
dataset);
void KBSFPGA_GenerateCovarianceMatix(Vector securities, void*
dataset,
Matrix* covarianceMatrix);
/*
 * Used to generate a z-matrix i.e. a matrix of independent standard
normal distribution random numbers.
 * The rows is determined by the numOfRiskFactors and the columns is
determined by the numOfScenarios.
 */
void* KBSFPGA_GenerateRandomMatrix(int numOfRiskFactors, int
numOfScenarios);
void KBSFPGA_GenerateRandomMatrix(int numOfRiskFactors, int
numOfScenarios, Matrix* randomMatrix);
/*
 * Used to decompose the covariance matrix.
 * The covariance matrix is decomposed using Singular Value
Decomposition (SVD).
 * Returns the decomposed form - sqrt(s) transpose(u) of the
covariance matrix
 */
void* KBSFPGA_DecomposeCovarianceMatrix(void* covarianceMatrix);
void KBSFPGA_DecomposeCovarianceMatrix(void* covarianceMatrix,
Matrix*
decomposedCovarianceMatrix);
/*
 * Used to generate the 1-day return vector for the risk
factors.
 * Returns the return vector for the different risk factors.
 */
Matrix KBSFPGA_GetReturnMatrix(void*
decomposedCovarianceMatrix, void*
randomMatrix);
/*
 * Used to multiply two matrices.
 * Returns the result of multiplying the two matrices.
 */
void* KBSFPGA_MultiplyMatrix(void* lhs, void* rhs);
void KBSFPGA_MultiplyMatrix(void* lhs, void* rhs, Matrix* result);
/*
 * Used to perform multivariate regression.
 * Returns the coefficients of the regression.
 */
void* KBSFPGA_MultiVariateRegression(Matrix observations,
Vector
targets);
void KBSFPGA_MultiVariateRegression(Matrix observations,
Vector
targets, Vector coefficients);
/*
 * Used to solve a system of linear equations by Gauss-Jordan
elimination.
 * We can also provide other methods that can solve a
system of linear
equations.
 * Here Gauss-Jordan elimination method is provided as an example.
 * Returns the work matrix.
 */
void* GaussJordanSolver(Matrix coefficients, Vector
solutions);
void GaussJordanSolver(Matrix coefficients, Vector solutions,
Matrix
workMatrix);
#endif
            mvattribution.c
#include <kbsfpga.h>
int main( )
{
    /*
     * Assume we have the observations for the various
    factors
    (independent variables) and the target (dependent variable) available
     */
    Matrix observations = getAlphaFactorObservations( );
    Vector targets = getRegressionTargets( );
```

-continued

```
    void* coefficients =
KBSFPGA_MultiVariateRegression(observations, targets);
}
            var.c
#include <kbsfpga.h>
int main( )
{
    /*
     * Assume security data and return data for securities are
    available from some repository, say - Vision
     */
    Vector securities = getSecurities( );
    Matrix secReturns = getSecReturnDataFor(securities);
    void* dataset = KBSFPGA_UploadSecurityData(securities,
secReturns);
    Vector portSecurities =
getSecuritiesInPortfolio("MY_PORTFOLIO");
    void* covarianceMatrix =
KBSFPGA_GenerateCovarianceMatrix(portSecurities, dataset);
    void* zMatrix =
KBSFPGA_GenerateRandomMatrix(portSecurities.count, 100000);
    void* decomposedCovarianceMatrix =
KBSFPGA_DecomposeCovarianceMatrix(covarianceMatrix);
    Matrix returnMatrix =
KBSFPGA_GetReturnMatrix(decomposedCovarianceMatrix, zMatrix);
}
```

Referring back to FIG. 1, system 10 communicates to host computer through an I/O interface 13. The host computer may be a computer node 60, 50 in a network of computers as illustrated in FIG. 2.

Figure 2:
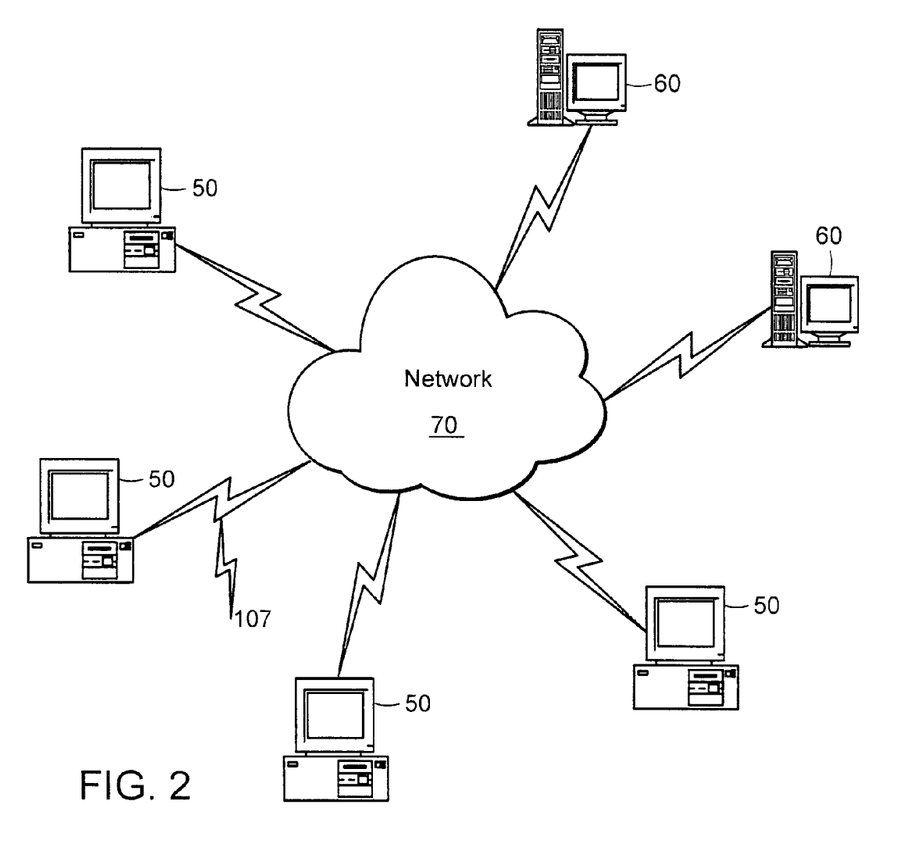
FIG. 2 is a schematic diagram of a computer network in which embodiments of the present invention operate.

FIG. 2 illustrates a generalized computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
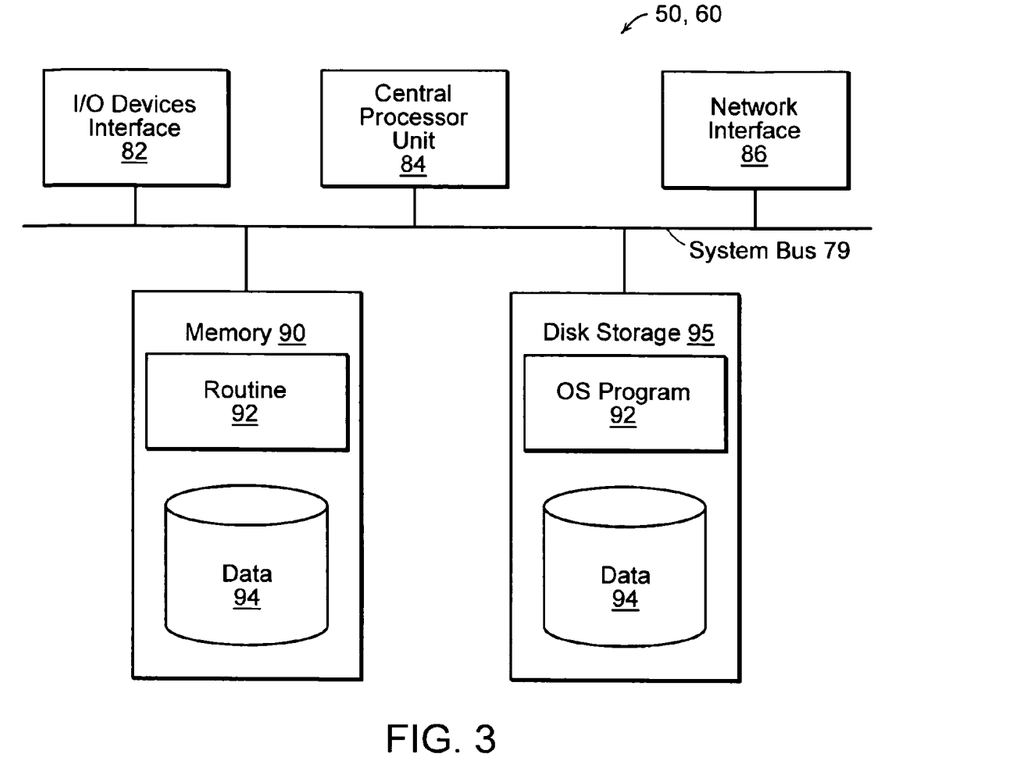
FIG. 3 is a block diagram of a computer node in the network of FIG. 2.

FIG. 3 is a diagram of the internal structure of a computer (e.g., client processor/device 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention (e.g., FPGA building blocks 15, API's 14 and applications 11 detailed above). Disk storage 95 provides non-volatile storage for computer software instructions 92 and data 94 used to implement an embodiment of the present invention. Central processor unit (CPU) 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, building blocks 15 may be distributed on one or more computers 50, 60. Alternatively, a computer node 50, 60 may be dedicated to a respective building block 15. Further, one or more PCI cards/boards 12 may be employed to carry the FPGA building blocks 15. Accordingly, a computer 50, 60 may be customized having certain PCI cards/boards 12 with desired ones of the FPGA building blocks 15.

Figure 4:
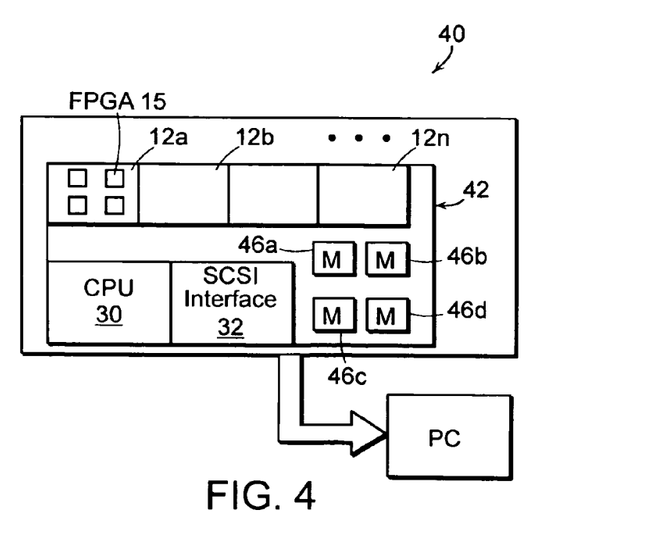
FIG. 4 is a block diagram of a computer system embodying the present invention.

Illustrated in FIG. 4 is yet another embodiment of the present invention. Presented is a computer system 40 having a mother board 42 carrying a CPU 30, typical SCSI interface 32 (for I/O and network communications) and working or storage memory 46. Also coupled to or otherwise carried on mother board 42 is a plurality of PCI boards 12 holding invention FPGA's/processing units 15. Preferably there are sixteen PCI boards 12 and each PCI board 12 holds four FPGA's 15. The FPGA's are programmed as described above to respectively implement fundamental algebraic operations, statistical operations and real time matrix building operations employed by desired applications for financial or other computing, quantitative analyses and the like.

In some embodiments computer system 40 employs a Windows™ (Microsoft) operating system and in other embodiments a Linux operating system. Other operating systems and board configurations are suitable.

While this invention has been particularly shown and described with references to example embodiments thereof, it will be understood by those skilled in the art that various changes in form and details may be made therein without departing from the scope of the invention encompassed by the appended claims.

Other configurations, combinations and computer architectures (stand alone or networked) are suitable and in the purview of one skilled in the art given the foregoing description.

APPENDIX I

/*PROC JOHANSEN
Pedro J. F. de Lima, May 1993
Department of Economics, The Johns Hopkins University
   This code is written and submitted for public, non-commercial use.
   There are no performance guarantees.
   Please acknowledge this code (and its author)
   if you find it useful in your own work
FORMAT
   {tr, 1_max, z}=johansen (levels, nlags);
INPUT
   levels—levels of N series to test for cointegration
   nlags—number of lags in the VAR specification
OUTPUT
   tr—Trace Statistic, for the hypothesis that there are at most q=0, 1, 2, . . . , n−1 cointegrating vectors against the completely unrestricted VAR(P) model.
      That is Ho: r<=q H1: 0<=q<n.
   1-max—1 max statistic for the null hypothesis that there are at most r<=q cointegrating vectors (q=0, 1, . . . , n−1) against the alternative that only one additional cointegrating vector exists.
   z—N×N*3 matrix with the following three N×N matrices:
      —E=N×N matrix of normalized eigenvectors (E'Spp E=I), the first column of E giving the eigenvector associated with the largest eigenvalue and so on.
      —S00=N×N matrix with the product moment matrix S00
      —S0p=N×N matrix with the product moment matrix S0p
   These matrices are required to compute the cointegrating vectors á, the parameters à, the long run matrix ã=àá, and the variance matrix of the residuals, once r, the # of cointegrating vectors, is defined.
   See the procedure COINTEGR
*/

```
proc (3)-johansen(levels,p);
local    N,T,diff,x,i,y0t,ypt,q,r0t,rpt,s00,s0p,sp00,spp,c,cc,
         lamda,vlambda,lr;
N=cols(levels);
T=rows(levels);
diff=(levels-lag1(levels));
x=diff;
i=1;do while i<=p−1;
x=x~lagn(diff,i);
i=i+1;
endo;
x=packr(x);
y0t=x[.,1:N];
ypt=packr(lagn(levels,p));
x=x[.,N+1:p*N];
q=invpd(x'x);
R0t=y0t−x*q*x'y0t;
Rpt=ypt−x*q*x'ypt;
s00=r0t'r0t/T;
s0p=r0t'rpt/T;
sp0=s0p';
```

```
spp=rpt'rpt/T;
c=chol(spp)';
c=inv(c);
{lambda, vlambda}=eigrs2(cc*sp0*invpd(s00)*s0p*cc');
retp(rev(-T*cumsumc(ln(1-lambda))),rev(-T*1n(1-
    lambda)), (rev((cc'vlambda)')')~s00~s0p);
endp;
/*PROC CI_VEC
Pedro J. F. de Lima, May 1993
Department of Economics, The Johns Hopkins University
FORMAT
    {beta, alpha, lrun, omega}=ci_vec(mat,r);
INPUT
    mat—n×3n matrix=to various as defined in proc johansen
    r—number of cointegrating vectors
OUTPUT
    beta-estimate of the cointegrating vector á.
    alpha-estimate of à.
    lrun-estimate of the long run matrix ã=áà
    omega-estimate of ê, the variance matrix of the VAR(P)
        innovations
*/
proc (4)=ci_vec(mat,r);
local e,n,beta,alpha;
beta=mat[.,1:r];
n=rows(mat);
alpha=-mat[.,2*n+1:3*n]*beta;
retp(beta,alpha,-mat[.,2*n+1:3*n]*beta*beta',mat[.,n+1:
    2*n]-alpha*alpha'); endp;
```

What is claimed is:

1. An analytical computing apparatus comprising:
one or more analytical processing units carried on one or more computer processing cards, each unit being formed of a respective field programmable gate array and performing a respective analytical operation, the analytical processing units being configured to allow different analytical operations to be performed in parallel by different field programmable gate arrays on the one or more computer processing cards in a manner such that the analytical processing units enable massively parallel computation, in a single computer, on the order of at least hundreds to thousands of double precision numbers; and
an application interface enabling use, including parallel use, of respective desired ones of the analytical processing units by one or more computer application programs, the application interface selectively interacting with different ones of the analytical processing units in a manner allowing different computer application programs to utilize different ones of the analytical processing units and to perform massively parallel computations that allow hundreds to thousands of double precision numbers, each computer application program performing a respective analytical computation through respective ones of the analytical processing units, such that the analytical computing apparatus in a single computer provides a massively parallel hardware accelerated numerical system and analysis.

2. Apparatus as claimed in claim 1 wherein the respective analytical operations of the analytical processing units include any of algebraic operations, statistical operations and real time matrix operations.

3. Apparatus as claimed in claim 2 wherein the algebraic operations include matrix mathematics operations and linear equation solving.

4. Apparatus as claimed in claim 2 wherein the statistical operations include random number generation, variance-covariance matrix construction, correlation matrix construction, maximum likelihood estimation, and non-stationary correlation among a time series.

5. Apparatus as claimed in claim 2 wherein the real time matrix operations include option pricing, pricing mortgage backed securities, interest rate prediction and foreign exchange rate prediction.

6. Apparatus as claimed in claim 1 wherein the computer application programs include analytical financial applications implementing any of portfolio value at risk calculations, portfolio optimization, alpha back testing, algorithm trading and multivariant regulation analysis.

7. A method of forming massively parallel computing apparatus comprising:
distributing one or more analytical processing units on one or more computer processing cards of a computer in a manner supporting multiple application programs, each analytical processing unit being formed of a respective field programmable gate array and performing a respective analytical operation, the analytical processing units being configured to allow different analytical operations to be performed in parallel by different field programmable gate arrays on the one or more computer processing cards; and
providing an application interface between the analytical processing units and application programs, the application interface interacting with and using in parallel respective desired ones of the analytical processing units by one or more computer application programs in a manner enabling massively parallel computation on the order of at least hundreds to thousands of double precision numbers, different computer application programs utilizing different ones of the analytical processing units and performing massively parallel computations, each computer application program performing a respective analytical computation through respective ones of the analytical processing units, such that a hardware accelerated numerical system and analysis in a single computer results and a massively parallel computer system capable of hundreds to thousands of double precision numbers results.

8. The method as claimed in claim 7 wherein the respective analytical operations of the analytical processing units include any of algebraic operations, statistical operations and real time matrix operations.

9. The method as claimed in claim 8 wherein the algebraic operations include matrix mathematics operations and linear equation solving.

10. The method as claimed in claim 8 wherein statistical operations include random number generation, variance-covariance matrix construction, correlation matrix construction, maximum likelihood estimation, and non-stationary correlation among a time series.

11. The method as claimed in claim 8 wherein the real time matrix operations include option pricing, pricing mortgage backed securities, interest rate prediction and foreign exchange rate prediction.

12. The method as claimed in claim 7 wherein the computer application programs include analytical financial applications implementing any of portfolio value at risk calculations, portfolio optimization, alpha back testing, algorithm trading and multivariant regulation analysis.

13. A Computer system for analytical computing, comprising:
one or more computer processing cards;
a plurality of analytical processing means carried on the computer processing cards, each processing means being formed of a respective field programmable gate array (FPGA) and performing a respective analytical operation, configuration of the plurality of analytical processing means across the one or more computer processing cards enabling massively parallel computation on the order of at least hundreds to thousands of double precision numbers by the analytical processing means being configured to allow different analytical operations to be performed in parallel by different field programmable gate arrays on the one or more computer processing cards; and application interface means for enabling use, including parallel use, of respective desired ones of the analytical processing means by one or more computer application programs, the application interface means selectively interacting with different ones of the analytical processing units in a manner allowing different computer application programs to utilize different ones of the analytical processing means and to perform massively parallel computations that allow hundreds to thousands of double precision numbers, each computer application program performing a respective analytical computation through respective ones of the analytical processing units, wherein the plurality of analytical processing means together with the application interface means in a single computer provides massively parallel computational processing and hardware acceleration.

14. The computer system as claimed in claim 13 wherein the respective analytical operations of the analytical processing means include any of algebraic operations, statistical operations and real time matrix operations.

15. The computer system as claimed in claim 14 wherein the algebraic operations include matrix mathematics operations and linear equation solving.

16. The computer system as claimed in claim 14 wherein the statistical operations include random number generation, variance-covariance matrix construction, correlation matrix construction, maximum likelihood estimation, and non-stationary correlation among a time series.

17. The computer system as claimed in claim 14 wherein the real time matrix operations include option pricing, pricing mortgage backed securities, interest rate prediction and foreign exchange rate prediction.

18. The computer system as claimed in claim 13 wherein the computer application programs include analytical financial applications implementing any of portfolio value at risk calculations, portfolio optimization, alpha back testing, algorithm trading and multi-variant regulation analysis.

19. The computer system as claimed in claim 13 further comprising an application program coupled to one of the analytical processing means in a manner such that the application program is carried on the FPGA of the one analytical processing means.

20. The computer system as claimed in claim 19 wherein the application program coupled to the one analytical processing means is carried on a respective PCI board.

21. A computer system for analytical computing comprising:
a CPU coupled to a mother board;
a plurality of processing boards each coupled to the mother board and having one or more respective analytical processing units, each processing unit being formed of a respective field programmable gate array and performing a respective analytical operation, the analytical processing units being configured to allow different analytical operations to be performed in parallel by different field programmable gate arrays on the one or more computer processing cards;
working memory coupled to the motherboard; and
a system communication interface to elements on the motherboard and configured for enabling parallel use of respective desired ones of the analytical processing units by one or more computer application programs, the system communication interface selectively interacting with different ones of the analytical processing units in a manner allowing different computer application programs to utilize different ones of the analytical processing units and enabling massively parallel computational processing on the order of at least hundreds to thousands of double precision numbers, each computer application program performing a respective analytical computation, in a manner such that in a single computer (i) parallel computation through the analytical processing units is enabled and (ii) a hardware accelerated numerical system and analysis results.

22. A computer system as claimed in claim 21 wherein the respective analytical operations of the analytical processing units include any of algebraic operations, statistical operations and real time matrix operations.

23. A computer system as claimed in claim 22 wherein:
the algebraic operations include matrix mathematics operations and linear equation solving;
the statistical operations include random number generation, variance-covariance matrix construction, correlation matrix construction, maximum likelihood estimation, and non-stationary correlation among a time series; and
the real time matrix operations include option pricing, pricing mortgage backed securities, interest rate prediction and foreign exchange rate prediction.

* * * * *